United States Patent
Yen et al.

(10) Patent No.: US 10,692,077 B2
(45) Date of Patent: Jun. 23, 2020

(54) METHOD AND SYSTEM FOR CONVEYANCE OF MACHINE READABLE CODE DATA VIA PAYMENT NETWORK

(71) Applicant: Mastercard International Incorporated, Purchase, NY (US)

(72) Inventors: Philip Wei Ping Yen, Singapore (SG); Patrik Smets, Nijlen (BE); Michihiko Yoden, Singapore (SG)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 166 days.

(21) Appl. No.: 15/793,237

(22) Filed: Oct. 25, 2017

(65) Prior Publication Data

US 2019/0122206 A1 Apr. 25, 2019

(51) Int. Cl.
*G06Q 20/38* (2012.01)
*G06Q 20/36* (2012.01)
(Continued)

(52) U.S. Cl.
CPC ....... *G06Q 20/385* (2013.01); *G06Q 20/3274* (2013.01); *G06Q 20/36* (2013.01);
(Continued)

(58) Field of Classification Search
CPC ........ G06Q 40/00; G06Q 30/00; G06Q 20/00; G06Q 10/00
(Continued)

(56) References Cited

U.S. PATENT DOCUMENTS 5,890,137 A * 3/1999 Koreeda ............... G06Q 20/02
 705/26.82
8,204,828 B1 * 6/2012 Kuite ................. G06Q 20/105
 235/380

(Continued)

FOREIGN PATENT DOCUMENTS

| TW | 201539196 A | 10/2015 |
| WO | 2012/112822 A2 | 8/2012 |
| WO | 2014093943 A1 | 6/2014 |

OTHER PUBLICATIONS

The Lab Authority, ISO Magnetic Stripe Card (Year: 2019).*
(Continued)

*Primary Examiner* — Frantzy Poinvil
(74) *Attorney, Agent, or Firm* — Buchanan Ingersoll & Rooney PC

(57) ABSTRACT

A method for processing an encoded one-time number via payment rails includes: receiving, by a receiving device interfaced with a computing system, a one-time number, wherein the one-time number is comprised of at least an identification value and a remaining value; executing, by a querying module of the computing system, a query on a memory of the computing system to identify a routing number based on at least a portion of the one-time number; generating, by a generation module of the computing system, a data value, wherein the data value includes at least the identified routing number and the remaining value; and electronically transmitting, by a transmitting device of the computing system, the generated data value to an external system via payment rails associated with a payment network.

16 Claims, 5 Drawing Sheets

(51) Int. Cl.
*G06Q 20/32* (2012.01)
*G06Q 30/06* (2012.01)
*G06Q 20/40* (2012.01)

(52) U.S. Cl.
CPC ......... *G06Q 20/367* (2013.01); *G06Q 20/403* (2013.01); *G06Q 30/06* (2013.01)

(58) Field of Classification Search
USPC ...................................................... 705/3–44
See application file for complete search history.

(56) References Cited

U.S. PATENT DOCUMENTS

| | | | | |
|---|---|---|---|---|
| 8,600,898 | B2* | 12/2013 | Gilder | G06Q 20/04 |
| | | | | 705/53 |
| 8,712,910 | B2* | 4/2014 | Michelsen | G06Q 40/02 |
| | | | | 705/39 |
| 8,806,603 | B2* | 8/2014 | Svigals | G06F 21/44 |
| | | | | 705/35 |
| 10,373,156 | B2* | 8/2019 | Holmes | G06Q 20/3676 |
| 2013/0211937 | A1* | 8/2013 | Elbirt | G06Q 20/204 |
| | | | | 705/17 |
| 2014/0129428 | A1 | 5/2014 | Tyler et al. | |
| 2014/0172695 | A1* | 6/2014 | Kanjlia | G06Q 20/22 |
| | | | | 705/39 |
| 2014/0324693 | A1* | 10/2014 | Michelsen | G06Q 40/02 |
| | | | | 705/42 |
| 2015/0199290 | A1 | 7/2015 | Mathewson et al. | |
| 2015/0278814 | A1* | 10/2015 | Jaffe | G06Q 20/3276 |
| | | | | 705/44 |
| 2015/0332264 | A1* | 11/2015 | Bondesen | G06Q 20/405 |
| | | | | 705/44 |
| 2016/0132877 | A1* | 5/2016 | Carrott | G06Q 20/40 |
| | | | | 705/71 |
| 2017/0236122 | A1* | 8/2017 | Kurapati | G06Q 20/40 |
| | | | | 705/44 |
| 2018/0025422 | A1* | 1/2018 | Dhala | G06Q 20/40 |
| | | | | 705/38 |
| 2018/0082298 | A1* | 3/2018 | Modi | G06Q 20/4014 |

OTHER PUBLICATIONS

Bray, "Tap to Pay (Not So Much in the U.S.): Many abroad use smartphones to . . . ", New York Times (1923-Current file); Apr. 2, 2014; ProQuest Historical Newspapers: The New York Times, p. F1. (Year: 2014).*

Jabbar et al., "Growing the Blockchain Information Infrastructure", The Infrastructure of Trust, CHI, May 6-66, Denver, Co. USA. (Year: 2017).*

Notification of Transmittal of the International Search Report and the Written Opinion of the International Searching Authority (Forms PCT/ISA/220, PCT/ISA/210 and PCT/ISA/237) dated Oct. 15, 2018, by the European Patent Office in corresponding International Application No. PCT/US2018/046658. (10 pages).

Office Action dated Oct. 7, 2019, by the Taiwanese Patent Office in corresponding Taiwan Patent Application No. 107133677 and an English Translation of the Office Action. (10 pages).

* cited by examiner

METHOD AND SYSTEM FOR CONVEYANCE OF MACHINE READABLE CODE DATA VIA PAYMENT NETWORK

FIELD

The present disclosure relates to the processing of a one-time number encoded in a machine readable code via payment rails, specifically the reading of a one-time number encoded in a machine readable code and the conversion thereof into a data value suitable for conveyance via payment rails associated with a network for processing on behalf of a third party entity that supplies the one time number.

BACKGROUND

With the increasing prevalence of computing devices, many methods have been developed to enable a computing device to be used to fund an electronic payment transaction. Originally, a user could manually input payment details into their computing device, which would be transmitted for processing in the payment transaction, such as via a web page or other similar application program. As technology became more advanced, electronic wallets were developed, which were specialized application programs that utilized more secure methods of storage to store payment credentials, which could be electronically transmitted to a merchant point of sale through a network (e.g., the Internet) or even directly, such as via near field communication for an in-purchase transaction. Traditionally, electronic wallets have operated by storing all of the same data that would be stored in a payment card and conveying it to a point of sale, where the point of sale receives the same data that it would if reading the payment card directly, effectively trading a payment card for a mobile device that acts as a payment card.

In more recent times, some entities have developed their own kinds of electronic wallets that use alternative methods to pay for payment transactions. In such wallets, the wallet may generate unique data that is provided to the merchant, where the merchant routes that data back to the wallet provider or an associated financial institution that can identify a related account to be used to fund the transaction. Such methods provide for greater security than standard electronic wallets, as the unique data may be usable for only a single transaction, and may only be processed through merchants that are configured to receive and use such data. One common type of unique data is a one-time number.

However, the processing of one-time numbers and other unique data requires that the merchant be specially configured to receive and process such data, and that the merchant have a connection to the wallet provider or an associated financial institution. As a result, any new merchant that wants to accept that electronic wallet for payment must procure hardware and software and communication infrastructure specific to that electronic wallet. For many merchants, particularly small businesses, the resource expenditure may greatly outweigh the benefits provided in accepting such payment. In addition, expansion of the electronic wallet to additional markets may be a difficult, expensive, and time-consuming project.

Thus, there is a need for a technical solution where one-time numbers and other types of unique data generated by an electronic wallet can be processed using payment rails associated with a payment network to take advantage of existing electronic payment transaction processing and infrastructure.

SUMMARY

The present disclosure provides a description of systems and methods for processing encoded one-time numbers via payment rails. A machine-readable code that is encoded with a one-time number is read by a point of sale device. The point of sale device extracts the one-time number, or receives it via another suitable means, and identifies components of the one-time number, which includes at least an identification value. The identification value is used to identify a routing number associated with the wallet provider or a financial institution that is to process transactions funded via that one-time number. The routing number and any other data remaining in the one-time number are included in a new data value that is generated by the point of sale device, which also includes any other data necessary in the processing of a standard electronic payment transaction, such as a service code, expiration date, and check digit. This new data value is included in a standardized transaction message that is transmitted via payment rails associated with a payment network. The result is that the transaction looks like, and is therefore processed as, a traditional payment transaction on existing, secure communication infrastructure, but where it is routed to the appropriate entity for processing. Thus, the one-time number can be used for a payment transaction with minimal modification to merchant, acquirer, and issuer systems, providing for faster, easier, and less expensive implementation and thus facilitating wider adoption.

A method for processing an encoded one-time number via payment rails includes: receiving, by a receiving device of a computing system, a one-time number, wherein the one-time number is comprised of at least an identification value and a remaining value; executing, by a querying module of the computing system, a query on a memory of the computing system to identify a routing number based on at least a portion of the one-time number; generating, by a generation module of the computing system, a data value, wherein the data value includes at least the identified routing number and the remaining value; and electronically transmitting, by a transmitting device of the computing system, the generated data value to an external system via payment rails associated with a payment network.

A system for processing an encoded one-time number via payment rails includes: a receiving device of a computing system configured to receive a one-time number, wherein the one-time number is comprised of at least an identification value and a remaining value; a querying module of the computing system configured to execute a query on a memory of the computing system to identify a routing number based on at least a portion of the one-time number; a generation module of the computing system configured to generate a data value, wherein the data value includes at least the identified routing number and the remaining value; and a transmitting device of the computing system configured to electronically transmit the generated data value to an external system via payment rails associated with a payment network.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Figure 1:
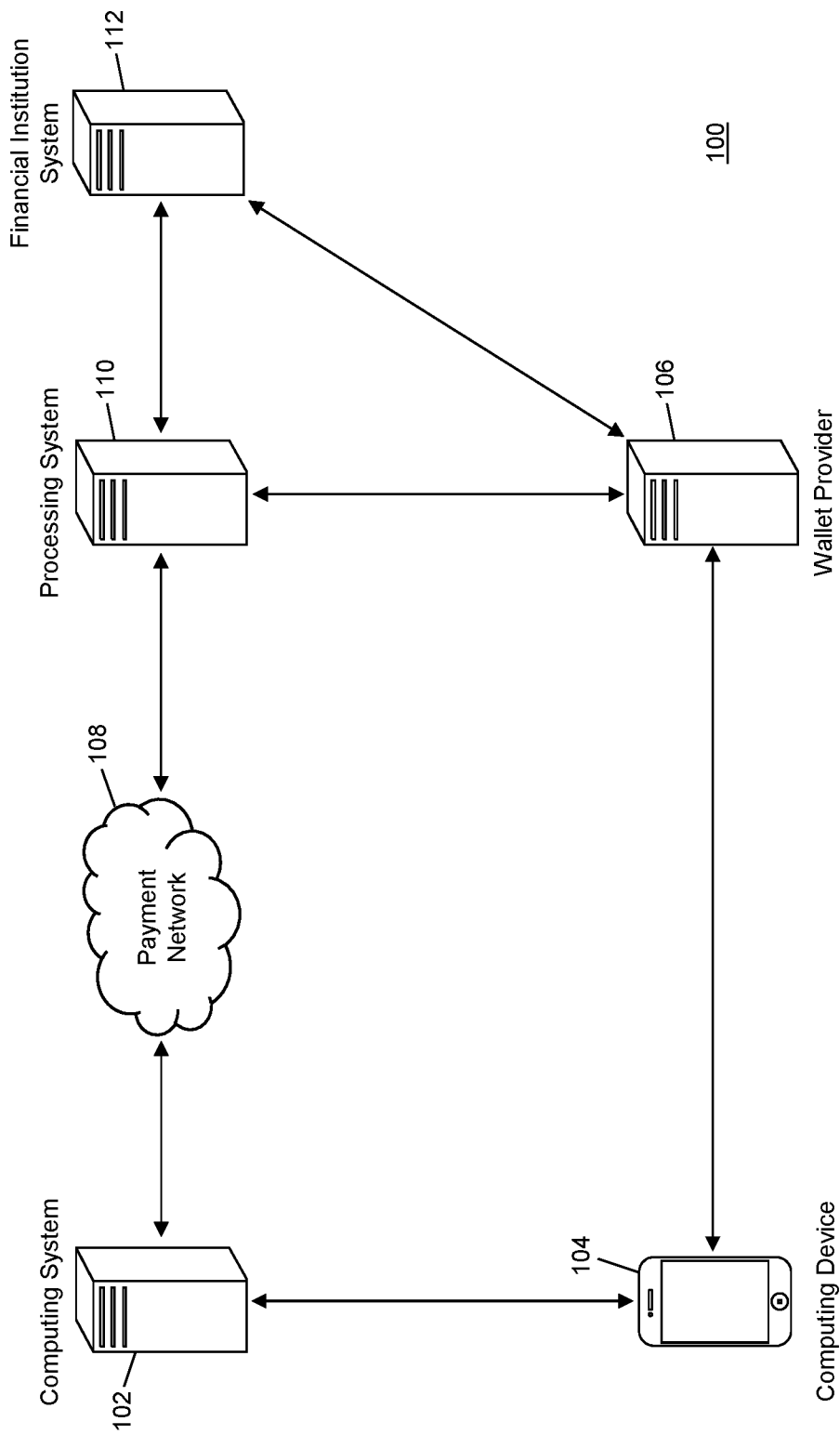
FIG. 1 is a block diagram illustrating a high level system architecture for processing a one-time number as a traditional electronic payment transaction in accordance with exemplary embodiments.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Payment Network—A system or network used for the transfer of money via the use of cash-substitutes for thousands, millions, and even billions of transactions during a given period. Payment networks may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes, which may include payment cards, letters of credit, checks, transaction accounts, etc. Examples of networks or systems configured to perform as payment networks include those operated by MasterCard®, VISA®, Discover®, American Express®, PayPal®, etc. Use of the term "payment network" herein may refer to both the payment network as an entity, and the physical payment network, such as the equipment, hardware, and software comprising the payment network.

Transaction Account—A financial account that may be used to fund a transaction, such as a checking account, savings account, credit account, virtual payment account, etc. A transaction account may be associated with a consumer, which may be any suitable type of entity associated with a payment account, which may include a person, family, company, corporation, governmental entity, etc. In some instances, a transaction account may be virtual, such as those accounts operated by PayPal®, etc.

Payment Rails—Infrastructure associated with a payment network used in the processing of payment transactions and the communication of transaction messages and other similar data between the payment network and other entities interconnected with the payment network that handles thousands, millions, and even billions of transactions during a given period. The payment rails may be comprised of the hardware used to establish the payment network and the interconnections between the payment network and other associated entities, such as financial institutions, gateway processors, etc. In some instances, payment rails may also be affected by software, such as via special programming of the communication hardware and devices that comprise the payment rails. For example, the payment rails may include specifically configured computing devices that are specially configured for the routing of transaction messages, which may be specially formatted data messages that are electronically transmitted via the payment rails, as discussed in more detail below.

Merchant—An entity that provides products (e.g., goods and/or services) for purchase by another entity, such as a consumer or another merchant. A merchant may be a consumer, a retailer, a wholesaler, a manufacturer, or any other type of entity that may provide products for purchase as will be apparent to persons having skill in the relevant art. In some instances, a merchant may have special knowledge in the goods and/or services provided for purchase. In other instances, a merchant may not have or require any special knowledge in offered products. In some embodiments, an entity involved in a single transaction may be considered a merchant. In some instances, as used herein, the term "merchant" may refer to an apparatus or device of a merchant entity.

Issuer—An entity that establishes (e.g., opens) a letter or line of credit in favor of a beneficiary, and honors drafts drawn by the beneficiary against the amount specified in the letter or line of credit. In many instances, the issuer may be a bank or other financial institution authorized to open lines of credit. In some instances, any entity that may extend a line of credit to a beneficiary may be considered an issuer. The line of credit opened by the issuer may be represented in the form of a payment account, and may be drawn on by the beneficiary via the use of a payment card. An issuer may also offer additional types of payment accounts to consumers as will be apparent to persons having skill in the relevant art, such as debit accounts, prepaid accounts, electronic wallet accounts, savings accounts, checking accounts, etc., and may provide consumers with physical or non-physical means for accessing and/or utilizing such an account, such as debit cards, prepaid cards, automated teller machine cards, electronic wallets, checks, etc. An issuer may also be connected to payment rails for use in the transmission and receipt of transaction messages thereby, including receipt of authorization request and transmission of authorization responses.

Acquirer—An entity that may process payment card transactions on behalf of a merchant. The acquirer may be a bank or other financial institution authorized to process payment card transactions on a merchant's behalf. In many instances, the acquirer may open a line of credit with the merchant acting as a beneficiary. The acquirer may exchange funds with an issuer in instances where a consumer, which may be a beneficiary to a line of credit offered by the issuer, transacts via a payment card with a merchant that is represented by the acquirer.

Payment Transaction—A transaction between two entities in which money or other financial benefit is exchanged from one entity to the other. The payment transaction may be a transfer of funds, for the purchase of goods or services, for the repayment of debt, or for any other exchange of financial benefit as will be apparent to persons having skill in the relevant art. In some instances, payment transaction may refer to transactions funded via a payment card and/or payment account, such as credit card transactions. Such payment transactions may be processed via an issuer, payment network, and acquirer. The process for processing such a payment transaction may include at least one of authorization, batching, clearing, settlement, and funding. Authorization may include the furnishing of payment details by the consumer to a merchant, the submitting of transaction details (e.g., including the payment details) from the merchant to their acquirer, and the verification of payment details with the issuer of the consumer's payment account used to fund the transaction. Batching may refer to the storing of an authorized transaction in a batch with other authorized transactions for distribution to an acquirer. Clearing may include the sending of batched transactions from the acquirer to a payment network for processing. Settlement may include the debiting of the issuer by the payment network for transactions involving beneficiaries of the issuer. In some instances, the issuer may pay the acquirer via the payment network. In other instances, the issuer may pay the acquirer directly. Funding may include payment to the merchant from the acquirer for the payment transactions that have been cleared and settled. It will be apparent to persons having skill in the relevant art that the order and/or categorization of the steps discussed above performed as part of payment transaction processing.

Point of Sale—A computing device or computing system configured to receive interaction with a user (e.g., a consumer, employee, etc.) for entering in transaction data, payment data, and/or other suitable types of data for the purchase of and/or payment for goods and/or services. The point of sale may be a physical device (e.g., a cash register, kiosk, desktop computer, smart phone, tablet computer, etc.) in a physical location that a customer visits as part of the transaction, such as in a "brick and mortar" store, or may be virtual in e-commerce environments, such as online retailers receiving communications from customers over a network such as the Internet. In instances where the point of sale may be virtual, the computing device operated by the user to initiate the transaction or the computing system that receives data as a result of the transaction may be considered the point of sale, as applicable.

System for Processing of One-Time Numbers Via Payment Rails

FIG. 1 illustrates a system 100 for processing of electronic payment transactions via encoded one-time numbers utilizing payment rails associated with a payment network.

The system 100 may include a computing system 102. The computing system 102, discussed in more detail below, may be configured to read and process one-time numbers that are encoded in a machine-readable code displayed to the computing system 102 and read thereby. The computing system 102 may be a specially configured point of sale system that is configured to perform the traditional functions of a point of sale in an electronic payment transaction as well as also specially configured to perform the additional functions discussed herein to facilitate the processing of electronic payment transactions utilizing one-time numbers and other similar unique data. In the system 100, the computing system 102 may read a machine-readable code that is displayed by a computing device 104. The computing device 104 may be any type of computing device suitable for displaying a machine-readable code that is encoded with a one-time number or other unique data, such as a cellular phone, smart phone, smart watch, wearable computing device, implantable computing device, laptop computer, tablet computer, notebook computer, etc.

The computing device 104 may be configured to execute an application program associated with an electronic wallet. The electronic wallet may be configured to generate a machine-readable code that is encoded with a one-time number. As used herein, "one-time number" may refer to a number or any other type of data that may be used for a single transaction that includes data suitable for use in performing the functions discussed herein. For instance, an alphanumeric value or other type of data may be used as an alternative to the one-time number. The machine-readable code may be any type of code suitable for encoding the one-time number, such as a bar code or a quick response (QR) code, a string display of numbers or alphanumeric values, etc. The one-time number may include at least an identification value, where any other data included in the one-time number may be referred to herein as "remaining value." In one embodiment, the one-time number may be an 18 digit number, where the first two digits may be the identification value, and where the other 16 digits may be the remaining value.

In the system 100, the one-time number may be supplied to the computing device 104 by a wallet provider 106 associated with the electronic wallet or may be generated using rules supplied by the wallet provider 106, such as through the electronic wallet application program. In instances where the one-time number may be generated by the computing device 104, the computing device 104 may electronically transmit the one-time number to the wallet provider 106 for storage thereby. In some cases, the wallet provider 106 may supply the computing device 104 with some or all of the remaining value, where the computing device 104 may utilize a stored identification value and any other data needed to comprise the remaining value, in addition to the received some or all of the remaining value, to create the one-time number.

Once the one-time number is generated or otherwise identified, the computing device 104 may generate the machine-readable code and display it on a display device, where the computing system 102 may use an optical imaging device to read the machine-readable code and decode the data encoded therein. As a result, the computing system 102 may obtain the one-time number. The computing system 102 may then generate a new data value. The one-time number may, alternatively, be conveyed to the computing system 102 via any other suitable means by the computing device 104. For instance, the computing device 104 may electronically transmit the one-time number to the computing system 102 via near field communication, Bluetooth, magnetic secure transmission, radio frequency, a cellular communication network, the Internet, etc.

The new data value may include at least the remaining value from the one-time number as well as a routing number, where the routing number is based on the identification value parsed from the one-time number. In some embodiments, the computing system 102 may store or otherwise have access to a lookup table where the routing number may be identified using the identification value. In the above example, the computing system 102 may identify the two-digit identification number and identify a routing number associated with the two-digit number. The routing number may be a number that is suitable for use by a payment network 108 in routing data received as part of an electronic payment transaction. The routing number may be, for instance, a bank identification number or issuer identification number. In some embodiments, the wallet provider 106 may provide the computing system 102 with routing numbers to be associated with identification values that may be included in one-time numbers.

In an exemplary embodiment, the data value generated by the computing system 102 may be in a format that is suitable for inclusion in a transaction message configured for transmission via payment rails associated with a payment network 108 and processing thereby. For instance, in one embodiment, the data value may be a track 2 data value and formatted accordingly, such as where the data value is a 32 digit number and where the routing number, remaining value, and other data are stored in specific digits as based on formatting used by the payment network 108. For instance, the track 2 data may be formatted pursuant to one or more standards governing the exchange of financial transaction messages, such as the International Organization of Standardization's ISO 8583 or ISO 20022 formats.

In some embodiments, the computing device 104 may be configured to generate the data value directly in the computing device 104 or receive it from the wallet provider 106. In such embodiments, the computing device 104 may be configured to generate the data value, which may be a track 2 data value, including the data suitable for use in the processing of the payment transaction, as discussed below. The computing device 104 may generate the data value for electronic transmission to the computing system 102, such as via the machine-readable code, near field communication, Bluetooth, magnetic secure transmission, radio frequency, etc. The computing system 102 may receive the data value accordingly, and proceed with the process discussed herein immediately. In some cases, the computing system 102 may first verify the data value, such as to ensure proper formatting based on the applicable standards.

The data value may be transmitted to the payment network 108 via payment rails associated therewith. In an exemplary embodiment, the data value may be included in a transaction message, where the transaction message is formatted pursuant to one or more applicable standards. In some embodiments, the computing device 102 may generate the transaction message, which may be electronically transmitted to the payment network 108 via payment rails associated therewith directly by the computing system 102 or via one or more intermediate entities, such as an acquiring financial institution and/or a gateway processor. In other embodiments, the computing device 102 may electronically transmit the data value and any other data necessary for use in processing an electronic payment transaction (e.g., a transaction amount, account number for receipt of funds, acquiring financial institution data, etc.) to an intermediate entity, such as an acquiring financial institution or gateway processor, which may generate the transaction message and include the data value therein. The transaction message may include at least a message type indicator and a plurality of data elements, where one of the data elements may be configured to store the generated data value, and where, in some cases, the data element may be specified by the applicable standard(s). Additional data elements may be used to store additional transaction data for the payment transaction, such as the transaction amount, merchant identification number, other merchant data, account number, acquiring institution data, geographic location, transaction time and/or date, currency type, transaction type, etc. The message type indicator may indicate a type of the transaction message for use by the payment network 108 in the processing thereof. For instance, the transaction message submitted by or on behalf of the computing system 102 may include a message type indicator indicating that the transaction message is an authorization request.

The payment network 108 may receive the transaction message and may process it using traditional methods and systems. Because the track 2 data is formatted pursuant to the applicable standards, the transaction message may be routed using standard processing techniques of the payment network 108 using the included routing number. In some embodiments, the payment network 108 may include a processing system 110 or may forward the transaction message to the processing system 110 for routing thereby.

In some cases, the transaction message may be routed to the wallet provider 106. The wallet provider 106 may then process the payment transaction, such as by ensuring that the transaction account associated with the one-time number (e.g., identified via the remaining value included in the data value stored in the transaction message) has sufficient balance or credit to cover the transaction amount. In other cases, the transaction message may be routed to a financial institution system 112, which may be part of or operated on behalf of a financial institution that may be associated with the transaction account to be used to fund the payment transaction (e.g., identified via the one-time number). For instance, the financial institution system 112 may be a financial institution that operates on behalf of the wallet provider 106 to manage transaction accounts issued to or otherwise used via the wallet provider 106.

The processing of the payment transaction may result in a decision by the wallet provider 106, or financial institution system 112, as applicable, to approve or deny the payment transaction. An authorization response, which may be a new transaction message or modified authorization request, may be returned to the payment network 108 via the payment rails associated therewith, where one of the data elements included therein is configured to store a response code indicating approval or denial of the payment transaction. The payment network 108 may forward the authorization response to the computing system 102, either directly thereto via the payment rails associated with the payment network 108 or to an intermediate entity, such as an acquiring financial institution, which may forward the authorization response to the computing system 102 or otherwise provide data to the computing system 102 indicating the result of the processing of the payment transaction. The computing system 102 may then finalize the payment transaction accordingly, such as by displaying a message indicating if the transaction was approved or denied. In some cases, the wallet provider 106 and/or financial institution system 112 may replace the one-time number with, or otherwise include in the authorization response, the transaction account number or other identification data associated with the related transaction account. In such cases, the payment network 108, financial institution system 112, or computing system 102 may be configured to perform additional services on behalf of the wallet provider 106 with respect to the transaction account, such as fraud monitoring or scoring.

In some embodiments, the wallet provider 106 or financial institution system 112 may be able to request that the user of the computing device 104 provide additional information in addition to the one-time number, such as for authentication or identification purposes. In such embodiments, the wallet provider 106 or financial institution system 112 may decline the payment transaction and submit the authorization response to the payment network 108 where the response code indicates that additional verification is necessary. In some cases, the response code may be one of a series of response codes, where the code may indicate the type of additional verification that is required. In some instances, the response code may be a repurposed response code according to the applicable standard(s). The computing system 102 may receive the response code and may display a message requesting that the corresponding additional verification be performed. For instance, a personal identification number (PIN) may be requested from the user of the computing device 104, where the user may input the PIN and the transaction processed again, with the PIN being included in a corresponding data element in a new transaction message submitted to the payment network 108 via the payment rails associated therewith.

In some embodiments, the computing system 102 may be configured to provide additional data to the wallet provider 106 or financial institution system 112 via the data value. For instance, the computing system 102 may include additional information associated with the payment transaction, which may be used by the wallet provider 106 or financial institution system 112, such as in making the determination as to whether or not to request additional verification. For example, the computing system 102 may provide geographic location information in the data value or in the data element configured to store the data value, which may be used by the wallet provider 106 in determining if additional verification should be requested (e.g., based on a geographic location of the computing device 104 identified thereby). In some cases, such supplied information may be specific to the wallet provider 106 and/or financial institution system 112 that is to receive the information.

The methods and systems discussed herein provide for the processing of electronic payment transactions via the use of one-time numbers that are processed by the computing system 102 to be routed via payment rails associated with payment networks 108 that are formatted pursuant to applicable standards, enabling traditional routing and processing to be performed for one-time numbers that are generated by or on behalf of an electronic wallet provider 106. The result is that a wallet provider 106 may use their own type of one-time number, which may be conveyed via a machine-readable code to the computing system 102, but still take advantage of the specialized and secured infrastructure of payment networks 108. The use of the existing processing infrastructure may enable one-time numbers to be used at a wide variety of merchants using traditional hardware, provided the system is specifically configured to generate the data value used in the payment transactions as discussed herein. Thus, one-time numbers may be used for electronic payment transactions with minimal modification to existing payment systems.

Computing System

Figure 2:
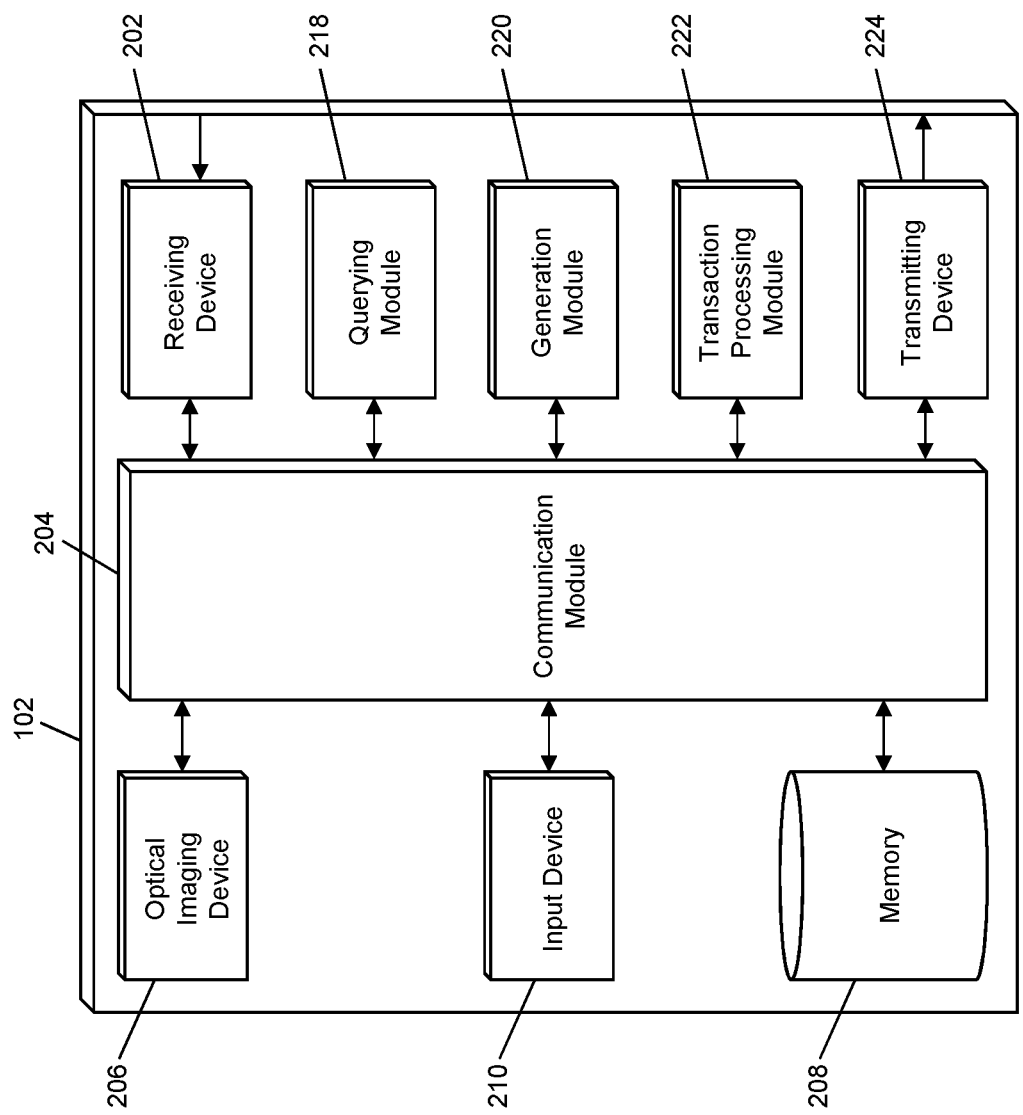
FIG. 2 is a block diagram illustrating the computing system of the system of FIG. 1 for the reading and processing of a one-time number in accordance with exemplary embodiments.

FIG. 2 illustrates an embodiment of a computing system 102 in the system 100. It will be apparent to persons having skill in the relevant art that the embodiment of the computing system 102 illustrated in FIG. 2 is provided as illustration only and may not be exhaustive to all possible configurations of the computing system 102 suitable for performing the functions as discussed herein. For example, the computer system 500 illustrated in FIG. 5 and discussed in more detail below may be a suitable configuration of the computing system 102.

The computing system 102 may include a receiving device 202. The receiving device 202 may be configured to receive data over one or more networks via one or more network protocols. In some instances, the receiving device 202 may be configured to receive data from computing devices 104, wallet providers 106, payment networks 110, and other systems and entities via one or more communication methods, such as radio frequency, local area networks, wireless area networks, cellular communication networks, Bluetooth, the Internet, etc. In some embodiments, the receiving device 202 may be comprised of multiple devices, such as different receiving devices for receiving data over different networks, such as a first receiving device for receiving data over a local area network and a second receiving device for receiving data via the Internet. The receiving device 202 may receive electronically transmitted data signals, where data may be superimposed or otherwise encoded on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by wallet providers 106 that are superimposed or otherwise encoded with routing numbers or data to be used in identifying routing numbers (e.g., financial institution identification data) and associations therewith with identification values to be included in one-time numbers. The receiving device 202 may also be configured to receive data signals electronically transmitted by payment networks 108, which may be transmitted via payment rails associated therewith and be superimposed or otherwise encoded with transaction messages.

The computing system 102 may also include a communication module 204. The communication module 204 may be configured to transmit data between modules, engines, databases, memories, and other components of the computing system 102 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the computing system 102 and external components of the computing system 102, such as externally connected databases, display devices, input devices, etc. The computing system 102 may also include a processing device. The processing device may be configured to perform the functions of the computing system 102 discussed herein as will be apparent to persons having skill in the relevant art. In some embodiments, the processing device may include and/or be comprised of a plurality of engines and/or modules specially configured to perform one or more functions of the processing device, such as a querying module 218, generation module 220, transaction processing module 222, etc. As used herein, the term "module" may be software or hardware particularly programmed to receive an input, perform one or more processes using the input, and provides an output. The input, output, and processes performed by various modules will be apparent to one skilled in the art based upon the present disclosure.

In some embodiments, the computing system 102 may include an optical imaging device 206. The optical imaging device 206 may be interfaced with the computing system 102 and configured to optically image physical media and provide data associated therewith to the computing system 102 for use thereby. The optical imaging device 206 may be configured to read a machine-readable code, such as displayed by the computing device 104, to read the data encoded therein. The optical imaging device 206 may be configured to read and decode bar codes, QR codes, or other suitable types of machine-readable codes. In the system 100, the optical imaging device 206 may be configured to decode a one-time number from a machine-readable code displayed by the computing device 104, which may include at least an identification value and a remaining value. The optical imaging device 206 may also be configured to read, for instance, bar codes displayed on products being scanned for purchase by a user of the computing device 104 in the electronic payment transaction.

The computing system 102 may also include or be otherwise interfaced with one or more input devices 206. The input devices 206 may be internal to the computing system 102 or external to the computing system 102 and connected thereto via one or more connections (e.g., wired or wireless) for the transmission of data to and/or from. The input devices 206 may be configured to receive input from a user of the computing system 102, such as an employee of a merchant at which the computing system 102 is installed, which may be provided to another module or engine of the computing system 102 (e.g., via the communication module 204) for processing accordingly. Input devices 206 may include any type of input device suitable for receiving input for the performing of the functions discussed herein, such as a keyboard, mouse, click wheel, scroll wheel, microphone, touch screen, track pad, camera, optical imager, etc. The input device 206 may be configured to, for example, receive input by a user of the computing device 104 of additional verification data (e.g., a PIN, biometric data, etc.), or input by a user of the computing system 102, such as inputting additional transaction data to be used in the electronic payment transaction.

The computing system 102 may also include a memory 208. The memory 208 may be configured to store data for use by the computing system 102 in performing the functions discussed herein, such as public and private keys, symmetric keys, etc. The memory 208 may be configured to store data using suitable data formatting methods and schema and may be any suitable type of memory, such as read-only memory, random access memory, etc. The memory 208 may include, for example, encryption keys and algorithms, communication protocols and standards, data formatting standards and protocols, program code for modules and application programs of the processing device, and other data that may be suitable for use by the computing system 102 in the performance of the functions disclosed herein as will be apparent to persons having skill in the relevant art. In some embodiments, the memory 208 may be comprised of or may otherwise include a relational database that utilizes structured query language for the storage, identification, modifying, updating, accessing, etc. of structured data sets stored therein.

The memory 208 may be configured to store a lookup table or other form of data storage for use in storing associations between identification values and routing numbers. The memory 208 may also be configured to store formatting rules for use in generating data values based on one-time numbers, such as rules to define what digits are stored in what order and how data values are to be formatted. The memory 208 may also be configured to store additional transaction data for electronic payment transactions, such as may be used in the electronic payment transaction funded via the one-time number, which may include, for instance, a transaction amount, merchant data, product data, acquirer institution data, account data, geographic location data, reward data, loyalty data, offer data, etc.

The computing system 102 may include a querying module 218. The querying module 218 may be configured to execute queries on databases to identify information. The querying module 218 may receive one or more data values or query strings, and may execute a query string based thereon on an indicated database, such as the memory 208, to identify information stored therein. The querying module 218 may then output the identified information to an appropriate engine or module of the computing system 102 as necessary. The querying module 218 may, for example, execute a query on the memory 208 to identify a routing number that is associated with an identification value that is parsed from a one-time number read by the optical imaging device 206.

The computing system 102 may also include a generation module 220. The generation module 220 may be configured to generate data for use by the computing system 102 in performing the functions discussed herein. The generation module 220 may receive instructions as input, may generate data based on the instructions, and may output the generated data to one or more modules of the computing system 102. For example, the generation module 220 may be configured to generate notifications and other data messages for transmission to payment networks 108 or acquiring financial institutions or other intermediate entities. The generation module 220 may also be configured to generate data values for inclusion in transaction messages based on one-time numbers, where the data value includes at least a routing number and the remaining value included in a one-time number. In one embodiment, the data value may be track 2 data and may include at least the routing number, remaining value, a check digit, a service code, and an expiration date.

The computing system 102 may also include a transaction processing module 222. The transaction processing module 222 may be configured to perform functions associated with the processing of transactions as part of the computing system 102 as discussed herein. For example, the transaction processing module 222 may be configured to generating and format transaction messages, calculate transaction amounts, perform functions associated with approved or denied payment transactions, receive and submit authentication and validation data, and other associated functions.

The computing system 102 may also include a transmitting device 224. The transmitting device 224 may be configured to transmit data over one or more networks via one or more network protocols. In some instances, the transmitting device 224 may be configured to transmit data to payment networks 108, and other entities via one or more communication methods, local area networks, wireless area networks, cellular communication, Bluetooth, radio frequency, the Internet, etc. In some embodiments, the transmitting device 224 may be comprised of multiple devices, such as different transmitting devices for transmitting data over different networks, such as a first transmitting device for transmitting data over a local area network and a second transmitting device for transmitting data via the Internet. The transmitting device 224 may electronically transmit data signals that have data superimposed that may be parsed by a receiving computing device. In some instances, the transmitting device 224 may include one or more modules for superimposing, encoding, or otherwise formatting data into data signals suitable for transmission.

The transmitting device 224 may be configured to electronically transmit data signals to payment networks 108 via payment rails associated therewith that are superimposed or otherwise encoded with a transaction message that includes a data element configured to store a generated data value that includes at least a remaining value and a routing number. In some embodiments, the transmitting device 224 may be configured to electronically transmit a data signal to an intermediate entity, such as an acquiring institution or a gateway processor, that is superimposed or otherwise encoded with the generated data value and any other transaction data, for inclusion in a transaction message and forwarding to the payment network 108 via the payment rails associated therewith.

Processing of a Payment Transaction Using a One-Time Number

Figure 3:
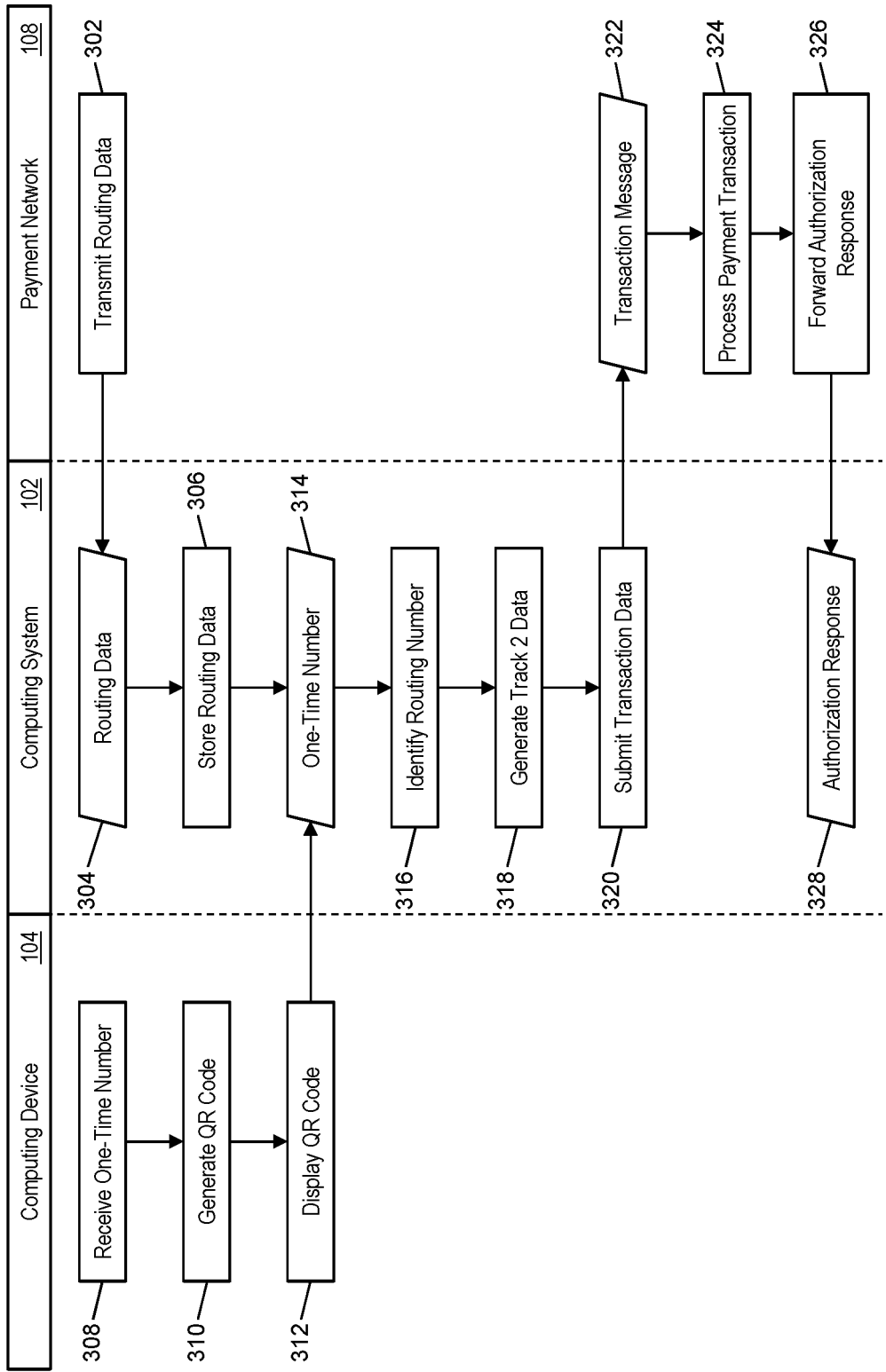
FIG. 3 is a flow diagram illustrating a process for the processing of an electronic payment transaction via payment rails using a one-time number in the system of FIG. 1 in accordance with exemplary embodiments.

FIG. 3 illustrates an example process executed in the system 100 of FIG. 1 for the processing of an electronic payment transaction funded via a one-time number that is transmitted using payment rails associated with a payment network.

In step 302, the payment network 108, wallet provider 106, or other entity may transmit routing data to the computing system 102. The routing data may include at least a plurality of different data pairs, each data pair including a routing number (e.g., a bank identification number or issuer identification number) and an associated identification value (e.g., a unique, two-digit number). In step 304, the receiving device 202 of the computing system 102 may receive the routing data. In step 306, the querying module 218 of the computing system 102 may execute a query on the memory 208 of the computing system 102 to store the routing data therein.

In step 308, the computing device 104 may receive a one-time number electronically transmitted thereto by the wallet provider 106. The one-time number may be an 18 digit number, where two of the digits comprise an identification value and where the other remaining 16 digits are additional data unique to the electronic payment transaction for use by the wallet provider 106 in the processing thereof. For instance, the remaining value may include data used in identifying a specific transaction account. In step 310, the computing device 104 may generate a QR code that includes the one-time number encoded therein. In step 312, the computing device 104 may display, on a display device interfaced therewith, the QR code with the encoded one-time number.

In step 314, the optical imaging device 206 of the computing system 102 may read the QR code displayed by the computing device 104 and decode the one-time number encoded therein. In step 316, the querying module 218 of the computing system 102 may execute a query on the memory 208 of the computing system 102 to identify a routing number that is associated with the identification value included in the decoded one-time number. In step 318, the generation module 220 of the computing system 102 may generate track 2 data, where the track 2 data is formatted pursuant to one or more standards (e.g., the ISO 8583 and/or ISO 20022 standards) and includes at least the routing number and remaining value. In some embodiments, the track 2 data may also include a check digit, service code, and an expiration date (e.g., encoded in the QR code or separately supplied by the computing device 104 or a user thereof, such as via the input device 210 of the computing system 102 or through an electronic transmission from the computing device 104 received by the receiving device 202).

In step 320, the transmitting device 224 of the computing system 102 may electronically transmit the generated track 2 data and any other transaction data to the payment network 108 via the payment rails associated therewith. In some embodiments, the computing system 102 may generate (e.g., via the generation module 220) a transaction message for transmission directly to the payment network 108. In other embodiments, the transaction data, including the track 2 data, may be transmitted to another entity (e.g., an acquiring financial institution) that generates the transaction message and submits it to the payment network 108 via the payment rails associated therewith on behalf of the computing system 102. In step 322, the payment network 108 may receive the transaction message.

In step 324, the payment network 108 may process the payment transaction using traditional methods and systems, which may include the routing of the transaction message to the wallet provider 106 or another authorized entity (e.g., the financial institution system 112) based on the routing number, and the approval or denial thereby. As part of the processing, the payment network 108 may receive an authorization response from the wallet provider 106 or authorized entity that includes a response code indicating the approval or denial of the payment transaction. In step 326, the payment network 108 may forward the authorization response to the computing system 102 (e.g., or an intermediate entity for transmission to the computing system 102) via the payment rails associated therewith. In step 328, the receiving device 202 of the computing system 102 may receive the authorization response. The computing system 102 may then finalize the payment transaction accordingly based on the response code included therein.

Exemplary Method for Processing an Encoded One-Time Number Via Payment Rails

Figure 4:
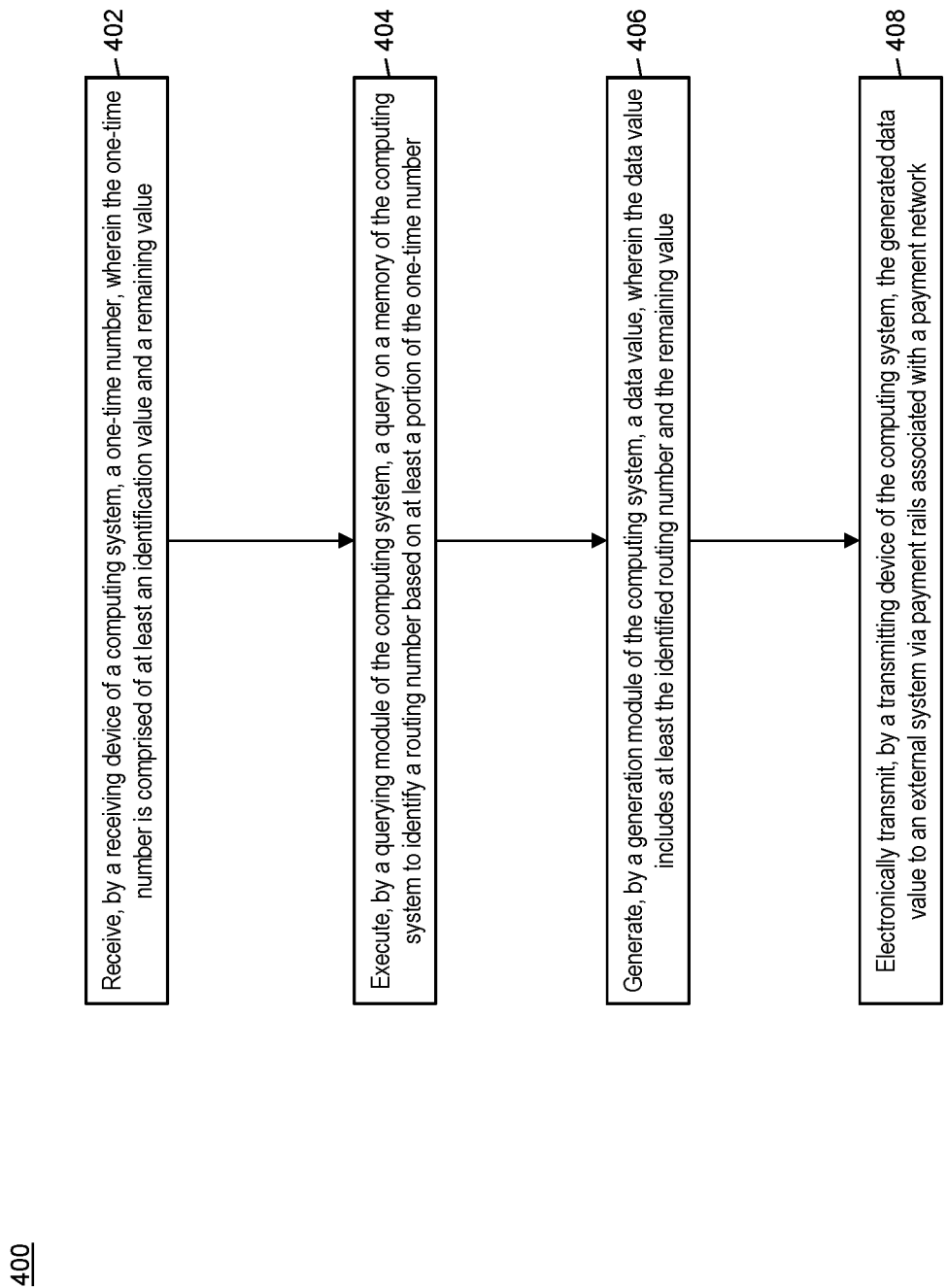
FIG. 4 is a flow chart illustrating an exemplary method for processing an encoded one-time number via payment rails in accordance with exemplary embodiments.

FIG. 4 illustrates a method 400 for the processing of a one-time number encoded in a machine-readable code prior to transmission of a data value based thereon via payment rails associated with a payment network for use in an electronic payment transaction.

In step 402, a one-time number may be received by a receiving device (e.g., the receiving device 202) of a computing system (e.g., the computing system 102), wherein the one-time number is comprised of at least an identification value and a remaining value. In step 404, a query may be executed on a memory (e.g., the memory 208) of the computing system by a querying module (e.g., the querying module 218) of the computing system to identify a routing number based on at least a portion of the one-time number.

In step 406, a data value may be generated by a generation module (e.g., the generation module 220) of the computing system, wherein the data value includes at least the identified routing number and the remaining value. In step 408, the generated data value may be electronically transmitted to an external system by a transmitting device (e.g., the transmitting device 224) of the computing system via payment rails associated with a payment network (e.g., the payment network 108).

In one embodiment, the method 400 may further include generating, by the generation module of the computing system, a transaction message, wherein the transaction message is formatted according to one or more standards and includes a plurality of data elements including at least one data element configured to store the generated data value, wherein transmission of the generated data value to the external system comprises transmission of the generated transaction message to the external system. In some embodiments, the data value may be a track 2 data value. In other embodiments, the data value may be a track 1 data value that includes an expiration date, service code, and check digit.

In one embodiment, the one-time number may be an 18 digit number. In a further embodiment, the identification value may comprise 2 digits of the 18 digit number and the remaining value may comprise 16 digits of the 18 digit number. In some embodiments, the receiving the one-time number may include reading, where the receiving device is an optical imaging device (e.g., the optical imaging device 206), a machine-readable code encoded with the one-time number to receive the encoded one-time number. In one embodiment, the machine-readable code may be one of: a bar code and a quick response code.

Computer System Architecture

Figure 5:
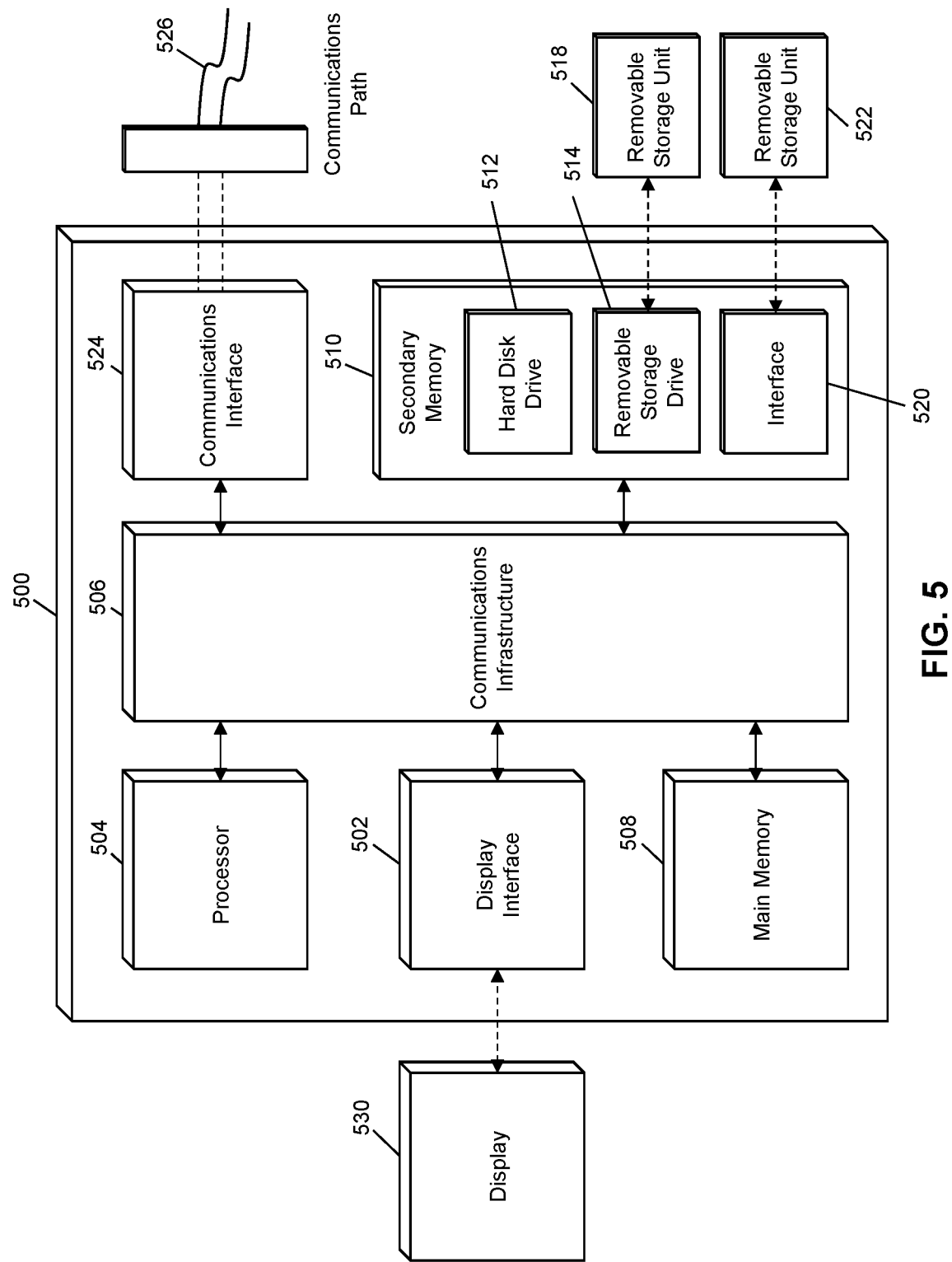
FIG. 5 is a block diagram illustrating a computer system architecture in accordance with exemplary embodiments.

FIG. 5 illustrates a computer system 500 in which embodiments of the present disclosure, or portions thereof, may be implemented as computer-readable code. For example, the computing system 102 of FIG. 1 may be implemented in the computer system 500 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 3 and 4.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 518, a removable storage unit 522, and a hard disk installed in hard disk drive 512.

Various embodiments of the present disclosure are described in terms of this example computer system 500. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 504 may be a special purpose or a general purpose processor device specifically configured to perform the functions discussed herein. The processor device 504 may be connected to a communications infrastructure 506, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 500 may also include a main memory 508 (e.g., random access memory, read-only memory, etc.), and may also include a secondary memory 510. The secondary memory 510 may include the hard disk drive 512 and a removable storage drive 514, such as a floppy disk drive, a magnetic tape drive, an optical disk drive, a flash memory, etc.

The removable storage drive 514 may read from and/or write to the removable storage unit 518 in a well-known manner. The removable storage unit 518 may include a removable storage media that may be read by and written to by the removable storage drive 514. For example, if the removable storage drive 514 is a floppy disk drive or universal serial bus port, the removable storage unit 518 may be a floppy disk or portable flash drive, respectively. In one embodiment, the removable storage unit 518 may be non-transitory computer readable recording media.

In some embodiments, the secondary memory 510 may include alternative means for allowing computer programs or other instructions to be loaded into the computer system 500, for example, the removable storage unit 522 and an interface 520. Examples of such means may include a program cartridge and cartridge interface (e.g., as found in video game systems), a removable memory chip (e.g., EEPROM, PROM, etc.) and associated socket, and other removable storage units 522 and interfaces 520 as will be apparent to persons having skill in the relevant art.

Data stored in the computer system 500 (e.g., in the main memory 508 and/or the secondary memory 510) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 500 may also include a communications interface 524. The communications interface 524 may be configured to allow software and data to be transferred between the computer system 500 and external devices. Exemplary communications interfaces 524 may include a modem, a network interface (e.g., an Ethernet card), a communications port, a PCMCIA slot and card, etc. Software and data transferred via the communications interface 524 may be in the form of signals, which may be electronic, electromagnetic, optical, or other signals as will be apparent to persons having skill in the relevant art. The signals may travel via a communications path 526, which may be configured to carry the signals and may be implemented using wire, cable, fiber optics, a phone line, a cellular phone link, a radio frequency link, etc.

The computer system 500 may further include a display interface 502. The display interface 502 may be configured to allow data to be transferred between the computer system 500 and external display 530. Exemplary display interfaces 502 may include high-definition multimedia interface (HDMI), digital visual interface (DVI), video graphics array (VGA), etc. The display 530 may be any suitable type of display for displaying data transmitted via the display interface 502 of the computer system 500, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 508 and secondary memory 510, which may be memory semiconductors (e.g., DRAMs, etc.). These computer program products may be means for providing software to the computer system 500. Computer programs (e.g., computer control logic) may be stored in the main memory 508 and/or the secondary memory 510. Computer programs may also be received via the communications interface 524. Such computer programs, when executed, may enable computer system 500 to implement the present methods as discussed herein. In particular, the computer programs, when executed, may enable processor device 504 to implement the methods illustrated by FIGS. 3 and 4, as discussed herein. Accordingly, such computer programs may represent controllers of the computer system 500. Where the present disclosure is implemented using software, the software may be stored in a computer program product and loaded into the computer system 500 using the removable storage drive 514, interface 520, and hard disk drive 512, or communications interface 524.

The processor device 504 may comprise one or more modules or engines configured to perform the functions of the computer system 500. Each of the modules or engines may be implemented using hardware and, in some instances, may also utilize software, such as corresponding to program code and/or programs stored in the main memory 508 or secondary memory 510. In such instances, program code may be compiled by the processor device 504 (e.g., by a compiling module or engine) prior to execution by the hardware of the computer system 500. For example, the program code may be source code written in a programming language that is translated into a lower level language, such as assembly language or machine code, for execution by the processor device 504 and/or any additional hardware components of the computer system 500. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 500 to perform the functions disclosed herein. It will be apparent to persons having skill in the relevant art that such processes result in the computer system 500 being a specially configured computer system 500 uniquely programmed to perform the functions discussed above.

Techniques consistent with the present disclosure provide, among other features, systems and methods for processing an encoded one-time number via payment rails. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for processing an encoded one-time number via payment rails, comprising:
    receive, by a receiving device of a point of sale device, a one-time number, wherein the one-time number is comprised of a two-part format, wherein (i) a first part of the two-part format includes an identification value, and (ii) a second part of the two-part format includes a remaining value associated with a transaction account;
    executing, by a querying module of the point of sale device, a query on a memory of the point of sale device to identify a routing number based on the identification value included in the first part of the two-part format of the one-time number;
    generating, by a generation module of the point of sale device, a data value, wherein the data value includes at least (i) the routing number that was identified based on the identification value included in the first part of the two-part format of the one-time number, and (ii) the remaining value, included in the second part of the two-part format of the of the one-time number, that is associated with the transaction account; and
    electronically transmitting, by a transmitting device of the point of sale device, the generated data value to an external system via payment rails associated with a payment network.

2. The method of claim 1, further comprising:
    generating, by the generation module of the point of sale device, a transaction message, wherein the transaction message is formatted according to one or more standards and includes a plurality of data elements including at least one data element configured to store the generated data value, wherein
    transmission of the generated data value to the external system comprises transmission of the generated transaction message to the external system.

3. The method of claim 1, wherein the data value is a track 2 data value.

4. The method of claim 1, wherein the data value is a track 1 data value that includes an expiration date, service code, and check digit.

5. The method of claim 1, wherein the one-time number is an 18 digit number.

6. The method of claim 5, wherein the identification value comprises 2 digits of the 18 digit number and the remaining value comprises 16 digits of the 18 digit number.

7. The method of claim 1, wherein receiving the one-time number includes reading, where the receiving device is an optical imaging device, a machine-readable code encoded with the one-time number to receive the encoded one-time number.

8. The method of claim 7, wherein the machine-readable code is one of: a barcode, quick response code, series of displayed digits or characters, and a programmable radio frequency identifier.

9. A system for processing an encoded one-time number via payment rails, comprising:
    a receiving device of a point of sale device configured to receive a one-time number, wherein the one-time number is comprised of a two-part format, wherein (i) a first part of the two-part format includes an identification value, and (ii) a second part of the two-part format includes a remaining value associated with a transaction account;
    a querying module of the point of sale device configured to execute a query on a memory of the point of sale device to identify a routing number based on the identification value included in the first part of the two-part format of the one-time number;
    a generation module of the point of sale device configured to generate a data value, wherein the data value includes at least (i) the routing number that was identified based on the identification value included in the first part of the two-part format of the one-time number, and (ii) the remaining value, included in the second part of the two-part format of the one-time number, that is associated with the transaction account; and a transmitting device of the point of sale device configured to electronically transmit the generated data value to an external system via payment rails associated with a payment network.

10. The system of claim 9, wherein the generation module of the point of sale device is further configured to generate a transaction message, wherein the transaction message is formatted according to one or more standards and includes a plurality of data elements including at least one data element configured to store the generated data value, and transmission of the generated data value to the external system comprises transmission of the generated transaction message to the external system.

11. The system of claim 9, wherein the data value is a track 2 data value.

12. The system of claim 9, wherein the data value is a track 1 data value that includes an expiration date, service code, and check digit.

13. The system of claim 9, wherein the one-time number is an 18 digit number.

14. The system of claim 13, wherein the identification value comprises 2 digits of the 18 digit number and the remaining value comprises 16 digits of the 18 digit number.

15. The system of claim 9, wherein receiving the one-time number includes reading, where the receiving device is an optical imaging device, a machine-readable code encoded with the one-time number to receive the encoded one-time number.

16. The system of claim 15, wherein the machine-readable code is one of: a barcode, quick response code, series of displayed digits or characters, and a programmable radio frequency identifier.

* * * * *